United States Patent
Valimaki et al.

(10) Patent No.: US 11,237,842 B2
(45) Date of Patent: Feb. 1, 2022

(54) SYSTEMS AND METHODS FOR TRANSMITTING DATA FROM MULTIPLE SOURCES TO MULTIPLE DESTINATIONS

(71) Applicant: Tuxera Corporation, Helsinki (FI)

(72) Inventors: Mikko Valimaki, Espoo (FI); Nadir Javed, Helsinki (FI); Szabolcs Szakacsits, Helsinki (FI); Claudio Camacho, Helsinki (FI)

(73) Assignee: Tuxera, Inc., Espoo (FI)

( * ) Notice: Subject to any disclaimer, the term of this patent is extended or adjusted under 35 U.S.C. 154(b) by 836 days.

(21) Appl. No.: 14/843,002

(22) Filed: Sep. 2, 2015

(65) Prior Publication Data

US 2016/0070444 A1 Mar. 10, 2016

Related U.S. Application Data

(60) Provisional application No. 62/046,089, filed on Sep. 4, 2014, provisional application No. 62/099,778, filed on Jan. 5, 2015.

(51) Int. Cl.
*G06F 9/445* (2018.01)
*H04L 29/06* (2006.01)

(52) U.S. Cl.
CPC .............. *G06F 9/445* (2013.01); *H04L 65/00* (2013.01); *H04L 65/4084* (2013.01); *H04L 65/4092* (2013.01); *H04L 65/604* (2013.01)

(58) Field of Classification Search
CPC ............. H04L 65/4084; H04L 65/4092; H04L 65/4069; H04L 2012/2849; H04L 65/00; H04L 65/604; G06F 3/165; G06F 9/542; G06F 9/445; H04R 2227/00; H04R 2227/05; H04N 21/4302; H04N 21/4305; H04N 21/4307; H04N 21/436; H04N 21/43615
See application file for complete search history.

(56) References Cited

U.S. PATENT DOCUMENTS

| | | | |
|---|---|---|---|
| 10,048,665 B2 * | 8/2018 | Hoshi | H04W 88/08 |
| 2007/0093239 A1 * | 4/2007 | Camp | H04L 29/06027 455/418 |
| 2008/0177822 A1 * | 7/2008 | Yoneda | H04L 12/282 709/202 |
| 2014/0108497 A1 * | 4/2014 | Yao | H04N 21/85406 709/203 |
| 2014/0362293 A1 * | 12/2014 | Bakar | H04N 5/4401 348/552 |
| 2015/0052222 A1 | 2/2015 | Farrell et al. | |
| 2015/0089372 A1 * | 3/2015 | Mandalia | G11B 27/10 715/720 |
| 2015/0098583 A1 * | 4/2015 | Millington | H04L 12/282 381/80 |
| 2015/0358666 A1 * | 12/2015 | Atake | H04N 21/4122 725/88 |

* cited by examiner

*Primary Examiner* — Angie Badawi
(74) *Attorney, Agent, or Firm* — J. Fish Law, PLLC

(57) ABSTRACT

A device configured to enable multi-room streaming is described. The device may be configured to enable multi-room streaming at diverse destination devices. The device may be configured to receive a user selection of a media item for playback at a plurality of diverse destination devices using a unified graphical user interface. The device may be configured to transmit respective commands such that the media item is paused at a start position without audible playback occurring at each of the destination devices.

10 Claims, 7 Drawing Sheets

SYSTEMS AND METHODS FOR TRANSMITTING DATA FROM MULTIPLE SOURCES TO MULTIPLE DESTINATIONS

RELATED APPLICATIONS

This application claims the benefit of U.S. Provisional Application No. 62/046,089, filed on Sep. 4, 2014, and U.S. Provisional Application No. 62/099,778, filed on Jan. 5, 2015 each of which are incorporated by reference in their respective entirety.

TECHNICAL FIELD

This disclosure relates to systems and methods for transmitting data and more particularly to techniques for enabling transmission of multimedia data from multiple storage devices to multiple destination devices.

BACKGROUND

Digital media may be stored on multiple sources including, removable storage devices including, for example, memory cards and removable drives, networked storage devices including, for example, local media servers and so-called cloud based storage devices. Further, digital media may originate from an online media service provider. Services provided by an online media service provider may be referred to as streaming services. Devices including laptop or desktop computers, tablet computers, televisions, digital video recorders, set-top boxes, digital media players, video gaming devices, video game consoles, audio systems, and cellular telephones, including so-called smart phones may include digital media playback capabilities. Typically, a user may want to access digital media using one device, an intermediate device, and ultimately have the digital media presented on another device, a destination device. For example, a user may wish to access a digital media file, such as a movie, using a smart phone and ultimately have the movie presented on a high resolution television.

Currently, it may be difficult for a user to transmit a media file from a source to a destination device using an intermediate device. That is, storage formats, device operating systems, and transmission protocols may not be compatible.

SUMMARY

In general, this disclosure describes techniques for enabling transmission of multimedia data from multiple types of storage devices to multiple types of destination devices. In one example, the techniques described herein may enable multimedia playback of different multimedia files to respective destination devices of different types during a single session. In one example, the techniques described herein may enable multimedia playback of a single multimedia file to respective destination devices of different types during a single session, where multimedia playback is synchronized.

According to one example of the disclosure, a method for controlling playback of a media file at a plurality of diverse destination devices comprises receiving a user selection of a media item for playback at a plurality of diverse destination devices, transmitting respective commands to each of the plurality of diverse destination devices, such that the media item is paused at a start position without audible playback occurring, and transmitting respective commands to each of the plurality of diverse destination devices to start audible playback of the media item.

According to another example of the disclosure, a device for controlling playback of a media file at a plurality of diverse destination devices comprises one or more processors configured to receive a user selection of a media item for playback at a plurality of diverse destination devices, transmit respective commands to each of the plurality of diverse destination devices, such that the media item is paused at a start position without audible playback occurring, and transmit respective commands to each of the plurality of diverse destination devices to start audible playback of the media item.

According to another example of the disclosure, a non-transitory computer-readable storage medium comprises instructions stored thereon, that upon execution, cause one or more processors of a device to receive a user selection of a media item for playback at a plurality of diverse destination devices, transmit respective commands to each of the plurality of diverse destination devices, such that the media item is paused at a start position without audible playback occurring, and transmit respective commands to each of the plurality of diverse destination devices to start audible playback of the media item.

According to another example of the disclosure, an apparatus for controlling playback of a media file at a plurality of diverse destination devices comprises means for receiving a user selection of a media item for playback at a plurality of diverse destination devices, means for transmitting respective commands to each of the plurality of diverse destination devices, such that the media item is paused at a start position without audible playback occurring, and means for transmitting respective commands to each of the plurality of diverse destination devices to start audible playback of the media item.

The details of one or more examples are set forth in the accompanying drawings and the description below. Other features, objects, and advantages will be apparent from the description and drawings, and from the claims.

DETAILED DESCRIPTION

Figure 1:
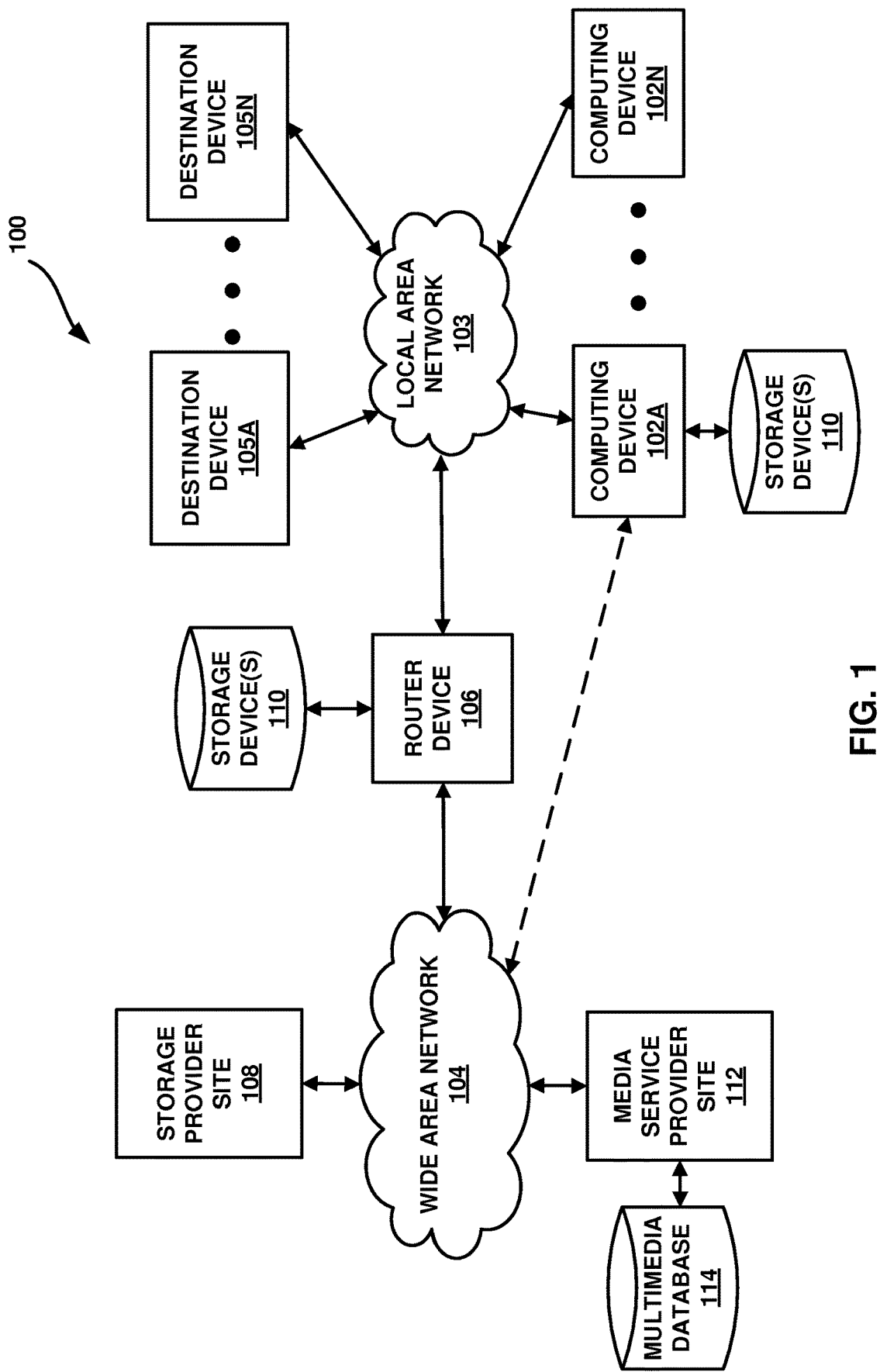
FIG. 1 is a conceptual diagram illustrating an example system that may implement one or more techniques of this disclosure.

In general, this disclosure describes techniques for enabling transmission of multimedia data from multiple types of storage devices to multiple types of destination devices. In particular, the systems and techniques described herein may enable wireless media streaming from a source device to diverse types of destination devices. Typical wireless media streaming systems are limited to a particular type of destination (i.e., rendering) device. For example, conventional wireless media streaming systems only allow media to be streamed from a source device to multiple destination devices if the multiple destination devices are all of the same type. That is, these systems are limited in that all of the destination devices are required to include a particular type of hardware (e.g., hardware supporting a particular proprietary streaming protocol). Such systems may be inconvenient and unnecessarily costly for a user to implement.

The systems and techniques described herein may enable a user to stream a multimedia file from a source device such as, for example, cloud storage, an online media service, a local storage device, and/or a media server, to multiple types of destination devices, such as, for example, a DLNA (Digital Living Network Alliance) device, an AirPlay device, a Google Cast device, a DIAL (Discovery and Launch) device, and/or an AllConnect receiver. The techniques described herein may be implemented using an intermediate device, such as, for example, a smart phone or tablet computer, including a unified controller. The systems and techniques described herein may be configured to fully support major streaming technologies. In one example, the systems and techniques described herein may be configured to support DLNA, DMS (Digital Media System), AirPlay (including AirPlay authentication), Google Cast (e.g., ChromeCast), DIAL, Wide DLNA Support, and RAOP (Airport Express speakers). Further, the systems and techniques described herein may include extended format support, multi-room/multi-device support, and may support online services. In one example, the systems and techniques described herein may be implemented using a software development kit (SDK). Further, the systems and techniques described herein may provide cross-platform support (e.g., support for both Android and iOS operating systems).

As described above, conventional wireless media streaming systems only allow media to be streamed from a source device to multiple destination devices including a particular type of hardware. This disclosure describes an example unified controller that includes an algorithm that allows a single device (i.e., a controller device) to simultaneously stream different media files to different rendering devices connected to the same network as the controller device. In one example, it allows a user to maintain playback control for each stream from a single device. In one example, the unified controller described herein may enable a user to stream different content to different target destination devices at the same time. Streaming different content to different target destination devices at the same time may be referred to as multi-session streaming. In one example, the unified controller described herein may enable a user to perform multi-session streaming using multiple source devices and individually control each source device using a single controller interface. The multi-session functionality enabled by the example unified controller described herein may be particularly useful in scenarios where a user is interested in consuming data behind a subscription based model service, such as, a Video on Demand or a music streaming services, that does not allow the same subscription to be logged on simultaneously on multiple devices.

It should be noted that even in the case where multiple destination devices include a particular type of hardware, it may be difficult for a user to stream a single media file to multiple destination devices simultaneously. For example, a user may wish to have an audio file playback in multiple rooms simultaneously. Having a media file playback in multiple rooms simultaneously may be referred to as multi-room streaming. An example unified controller described herein may include an algorithm that enables a user to synchronously stream a single media file to multiple target destination devices connected to the same local network regardless of the streaming technology utilized by a target destination device and without relying on any additional hardware for timing or synchronization signal.

In one example, multi-session and multi-room streaming functionality may be achieved by using an SDK, which supports major streaming technologies. In one example, a unified controller may be used to establish connections to target destination devices individually by utilizing a protocol that is supported by the target destination device. This may allow users to discover all the major streaming receivers through a unified interface and allow playback of different media files on each device through a device specific control/playback mechanism. In one example, this control mechanism may include an object referred to as a "StreamController" and may be assigned a unique ID upon connection to a device. A StreamController object may handle its own media regardless of other media being handled by other active controllers. A user may then control all the StreamController objects through a single interface by providing the unique ID of the controller. Thus, allowing users to control various devices through a single interface without worrying about maintaining each individual controller. In one example, the single interface may be referred to as a StreamManager Object.

FIG. 1 is block diagram illustrating an example of a system that may implement one or more techniques described in this disclosure. System 100 may be configured to enable a user to render media files in accordance with the techniques described herein. In the example illustrated in FIG. 1, system 100 includes one or more computing devices 102A-102N, local area network 103, wide area network 104, one or more destination devices 105A-105N, router device 106, storage provider site 108, storage device(s) 110, media service provider site 112, and multimedia database 114. System 100 may include software modules operating on one or more servers. Software modules may be stored in a memory and executed by a processor. Servers may include one or more processors and a plurality of internal and/or external memory devices.

Memory devices may include any type of device or storage medium capable of storing data. A storage medium may include tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. When the techniques described herein are implemented partially in software, a device may store instructions for the software in a suitable, non-transitory computer-readable medium and execute the instructions in hardware using one or more processors.

In the example illustrated in FIG. 1, computing devices 102A-102N may include any device configured to enable a user to access digital content, such as, for example, music, videos, images, and to transmit data to and/or receive data from local area network 103 and wide area network 104. For example, computing devices 102A-102N may be equipped for wired and/or wireless communications and may include set top boxes, digital video recorders, televisions, desktop, laptop, or tablet computers, gaming consoles, mobile devices, including, for example, "smart" phones, cellular telephones, and personal gaming devices.

Each of local area network 103 and wide area network 104 may comprise any combination of wireless and/or wired communication media. Each of local area network 103 and wide area network 104 may include coaxial cables, fiber optic cables, twisted pair cables, wireless transmitters and receivers, routers, switches, repeaters, base stations, or any other equipment that may be useful to facilitate communications between various devices and sites. Local area network 103 and wide area network 104 may be distinguished based on types of access. For example, wide area network 104 may include a network configured to enable access to the World Wide Web, for example, the Internet. Local area network 103 may be configured to enable a user to access a subset of devices (e.g., home devices and computing devices located within a user's home). Such access may be limited to a particular set of users based on a set of rules provided by a firewall. Local area network 103 may be referred to as a personal network.

Each of local area network 103 and wide area network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the IEEE 802 standards (e.g., Wi-Fi). In one example, computing devices 102A-102N may communicate over local area network 103 using a local networking protocol, such as for example, a protocol based on the IEEE 802 standards.

Referring again to FIG. 1, destination device(s) 105A-105N may include any device configured for media rendering. Destination devices 105A-105N may be configured to provide a user with an enhanced media rendering experience compared to a computing device 102A-102N. For example, in the case where a computing device includes a tablet computer having a small display (e.g., 6-10 inches) and small integrated speakers (e.g., 0.5-3 Watts), destination devices 105A-105N may include a large display (e.g., a commercially available High Definition or an Ultra High Definition Display with a size of 32-100 inches) and an audio system including multiple speakers (e.g., commercially available surround sound systems including high Wattage speakers). Thus, destination devices 105A-105N may include, for example, displays, televisions, audio receivers, audio amplifiers, speakers, and audio systems. In one example, user interfaces for destination devices 105A-105N may be relatively limited compared to an interface provided by computing devices 102A-102N. For example, in the case where a computing device includes a tablet computer and destination device includes an audio receiver, a tablet computer may include a touchscreen interface that enables a variety of playback options (e.g., playlist creation, volume controls, etc.) and an audio receiver may include an LCD interface, physical buttons, and knobs. Thus, in some instances, it is desirable for a user to control playback of media files using a computing device 102A-102N and render media files using a destination devices 105A-105N.

Destination devices 105A-105N may be configured to communicate with local area network 103 and wide area network 104 using one or more communication protocols, such as, for example, DLNA, AirPlay, Google Cast, DIAL, and AllConnect developed by Tuxera, Inc. Further, destination devices 105A-105N may be configured to communicate using one or more of the following communication protocols a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards (WiFi), Ultrawideband protocols, USB protocols, HDMI protocols, wireless display protocols, as well as various combinations thereof.

Referring again to FIG. 1, system 100 includes router device 106. Router device 106 may be configured to receive data from wide area network 104 and transmit data to a respective one of computing devices 102A-102N and destination devices 105A-105N using local area network 103. In one example, router device 106 may include a so-called Wi-Fi router and, in one example, may be configured to receive data from a modem device (e.g., a cable modem) and wirelessly transmit data to one of computing devices 102A-102N and destination devices 105A-105N.

As illustrated in FIG. 1, storage device(s) 110 may be operably coupled to router device 106 and computing devices 102A-102N. Storage device(s) 110 may include a storage medium. As described above, a storage medium may include optical discs, flash memory, magnetic memory, or any other suitable digital storage media. Storage device(s) 110 may be internal or external memory and in some examples may include non-volatile storage elements. Storage device(s) 110 may include memory cards (e.g., a Secure Digital (SD) memory card, including Standard-Capacity (SDSC), High-Capacity (SDHC), and eXtended-Capacity (SDXC) formats), internal/external hard disk drives, and/or internal/external solid state drives. Data stored on storage device(s) 110 may be stored according to a defined file system, such as, for example FAT, exFAT, NFTS, NTFS-3G, HFS+, VFAT, and/or EXT4 file systems. In one example, when operably coupled to a computing device 102A-102N or routing device 106, storage device(s) 110 may be accessible by one or more of computing devices 102A-102N and/or destination devices 105A-105N through a network and may be referred to as a network attached storage (NAS) device or a local media server.

Referring again to FIG. 1, data provider site 108 may be in communication with wide area network 104. Data provider site 108 represents an example of an online data service provider. A data service provider may include a service that enables a user to access digital data through any computing device connected to wide area network 104. In this manner, data service provider 108 may enable a user to access data regardless of a user's physical location. A data provider site may include a cloud storage service. As further illustrated in FIG. 1, a media service provider site 112 may also be in communication with wide area network 104. Media service provider site 112 represents an example of a multimedia service provider. Media service provider site 112 may be configured to access a multimedia library and distribute multimedia content to one or more of computing devices 102A-102N and/or destination devices 105A-105N. For example, media service provider site 112 may access multimedia (e.g., music, movies, and TV shows) stored in multimedia database 114 and provide a user of a media service with multimedia. Multimedia database 114 may be a storage device configured to store a library of multimedia content. In one example, media service provider site 112 may be configured to provide content to one or more of computing devices 102A-102N using the Internet protocol suite. In some examples, a media service may be referred to as a streaming service. Commercial examples of media services may include Hulu, YouTube, Netflix, Amazon Prime, and Pandora.

Figure 2:
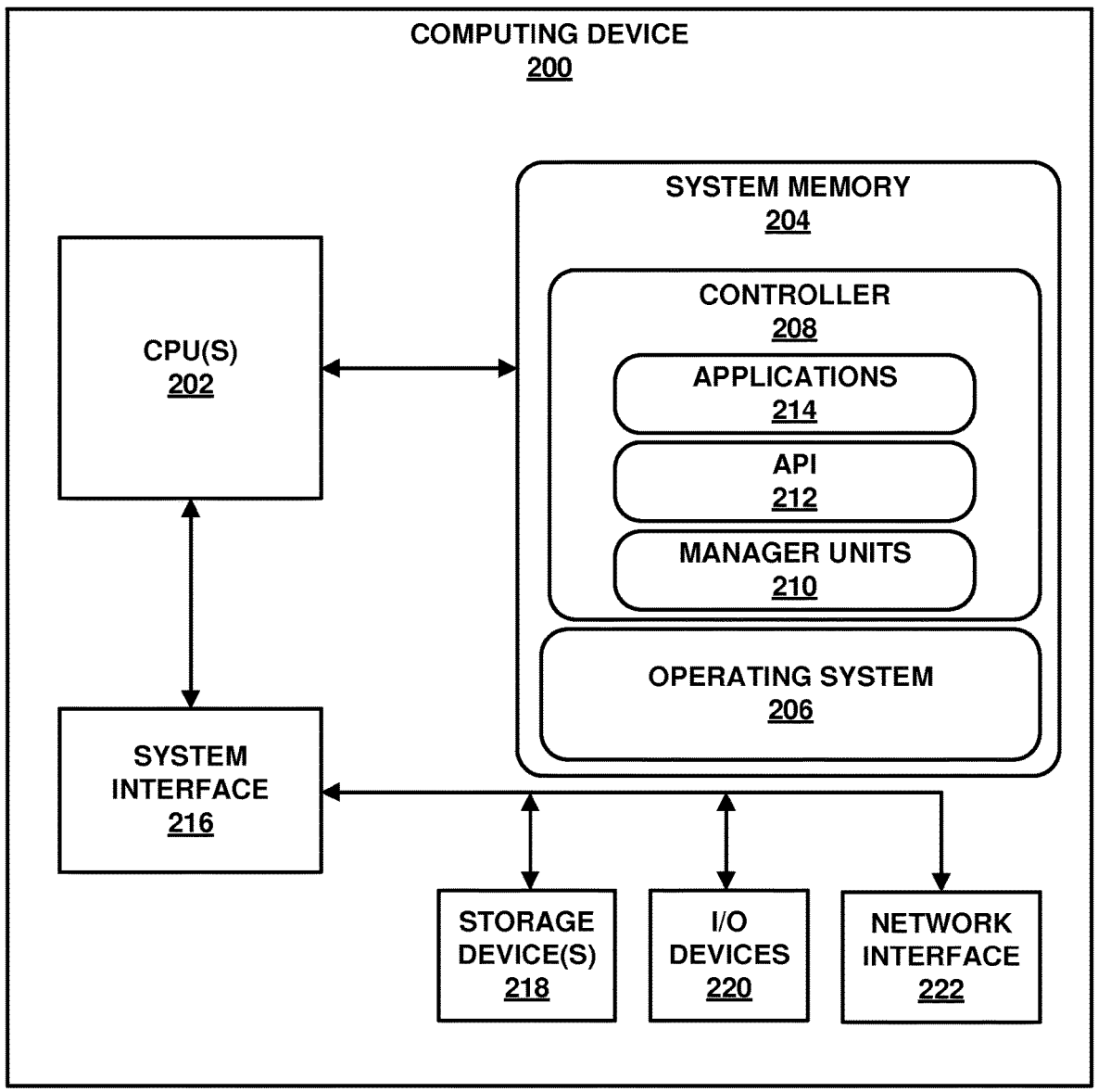
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 may include one or more processors and a plurality of internal and/or external storage devices. Computing device 200 is an example a computing device configured to enable a user to control playback of a media file on a destination device. Computing device 200 may be equipped for wired and/or wireless communications and may include devices, such as, for example, desktop or laptop computers, mobile devices, smartphones, cellular telephones, personal data assistants (PDA), tablet devices, personal gaming devices, and automotive infotainment systems.

As illustrated in FIG. 2, computing device 200 includes central processor unit(s) 202, system memory 204, system interface 216, storage device(s) 218, I/O device(s) 220, and network interface 222. As illustrated in FIG. 2, system memory 204 includes operating system 206 and a controller 208 including manager units 210, application programming interface (API) 212, and applications 214. It should be noted that although example computing device 200 is illustrated as having distinct functional blocks, such an illustration is for descriptive purposes and does not limit computing device 200 to a particular hardware or software architecture. Functions of computing device 200 may be realized using any combination of hardware, firmware and/or software implementations.

Central processing unit(s) 202 may be configured to implement functionality and/or process instructions for execution in computing device 200. Central processing unit (s) 202 may be capable of retrieving and processing instructions, code, and/or data structures for implementing one or more of the techniques described herein. Instructions may be stored on a computer readable medium, such as system memory 204 or storage devices 218. Central processing unit(s) (CPU(s)) 202 may include digital signal processors (DSPs), general purpose microprocessors, application specific integrated circuits (ASICs), field programmable logic arrays (FPGAs), or other equivalent integrated or discrete logic circuitry. Central processing unit(s) 202 may include one or more multi-core central processing units. Central processing unit(s) 202 may be configured such that dedicated graphic processing units (not shown) are used for graphics processing.

System memory 204 may be configured to store information that may be used by computing device 200 during operation. System memory 204 may be described as a non-transitory or tangible computer-readable storage medium. In some examples, system memory 204 may provide temporary memory and/or long-term storage. In some examples, system memory 204 or portions thereof may be described as non-volatile memory and in other examples portions of system memory may be described as volatile memory.

System interface 216 may be configured to enable communication between components of computing device 200. In one example, system interface 216 comprises structures that enable data to be transferred from one peer device to another peer device or to a storage medium. For example, system interface 216 may include a chipset supporting Peripheral Communications Interconnect (PCI) bus, Peripheral Communications Interconnect Express (PCIe) bus protocols, Universal Serial Bus protocols, proprietary bus protocols, or any other form of structure that may be used to interconnect peer devices.

Storage device(s) 218 represent memory of computing device 200 that may be configured to store different amounts of information for different periods of time than system memory 204. For example, storage device(s) 218 may be configured to store a user's multimedia collection. Similar to system memory 204, storage device(s) 218 may also include one or more non-transitory or tangible computer-readable storage media. Storage device(s) 218 may be internal or external memory and in some examples may include non-volatile storage elements. Storage device(s) 218 may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive.

I/O device(s) 220 may be configured to receive input and provide output for computing device 200. Input may be generated from an input device, such as, for example, touch-sensitive screen, track pad, track point, mouse, a keyboard, a microphone, video camera, or any other type of device configured to receive input. Output may be provided to output devices, such as, for example, speakers or a display device. In some examples, I/O device(s) 220 may be external to computing device 200 and may be operatively coupled to computing device 200 using a standardized communication protocol, such as for example, Universal Serial Bus (USB) protocol.

Network interface 222 may be configured to enable computing device 200 to communicate with external computing devices via one or more networks. For example, network interface 222 may be configured to enable computing device to communicate with storage provider site 108 and destination devices 105A-105N. Network interface 222 may include a network interface card, such as an Ethernet card, an optical transceiver, a radio frequency transceiver, or any other type of device that can send and receive information. Network interface 222 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 2, system memory 204 includes operating system 206 and controller 208 stored thereon.

Operating system 206 may be configured to facilitate the interaction of applications with central processing unit(s) 202, and other hardware components of computing device 200. Operating system 206 may be an operating system designed to be installed on laptops and desktops. For example, operating system 206 may be a Windows® operating system, Linux, or Mac OS. Operating system 206 may be an operating system designed to be installed on laptops, desktops, smartphones, tablets, set-top boxes, and/or gaming devices. For example, operating system 206 may be a Windows®, Linux, Mac OS, Android, iOS, Windows Mobile®, or a Windows Phone® operating system. It should be noted that although techniques are described herein according to a particular example operating system, the techniques described herein are not limited to a particular operating system.

Controller 208 may be configured to enable a user to access media data from a source device and may enable a user to manage media data, cause media data to be presented on a local device and/or a destination device. Controller 208 may be realized using any combination of hardware, firmware and/or software implementations. As illustrated in FIG. 2, controller 208 includes manager units 210, application program interface 212, and applications 214. Applications 214 may be any applications implemented within or executed by computing device 200 and may be implemented or contained within, operable by, executed by, and/or be operatively/communicatively coupled to components of computing device 200. Applications 214 may include instructions that may cause central processing unit(s) 202 of computing device 200 to perform particular functions. Applications 214 may cause central processing unit(s) 202 to write data to or read data from a computer readable medium, such as for example, system memory 204 and/or storage device(s) 218. Applications 214 may include algorithms which are expressed in computer programming statements, such as, for loops, while-loops, if-statements, do-loops, etc. Applications 214 may include media playback and management application. In one example, applications 214 may be configured to provide a user with graphical user interfaces (GUIs) that enable a user to initiate multi-session and/or multi-room streaming. For example, applications 214 may be configured to enable a user to select media files and devices for media playback. Further, applications 214 may enable users to create playlists, for example, M3U Playlists. Application 214 may include graphical user interfaces that enable a user to discover rendering devices connected to a local area network and control playback of media on devices.

Application program interface 212 may be configured to enable applications 214 to interface with operating system 206. That is, application program interface 212 may provide a layer of abstraction between applications 214 and operating system 206. Manager units 210 may be configured to manage aspects of playback of a media file on a destination device. Example manager units may include a content manager, a device manager, and a stream manager. A content manger may be configured to fetch and manage available media content, both from local and remote sources. In one example, a content manager may be configured to enable a user to browse media on local and remote sources. Further, in one example a content manager may allow a user to perform fast browsing, where fast browsing allows media data and/or media to be stored to a local cache of computing device. A device manager may be configured to discover and manage compatible destination devices connected to a local area network. For example, device manager may be configured discover and connect to destination devices 105A-105N. In one example device manager may be configured to discover one or more of the following types of destination devices: AirPlay, DLNA, Chromecast, and DIAL. A stream manager may be configured to provide functionality for streaming and controlling playback on any compatible receiver, for example, destination devices 105A-105N. An example stream manager is described in greater detail below with respect to FIG. 4.

Figure 3:
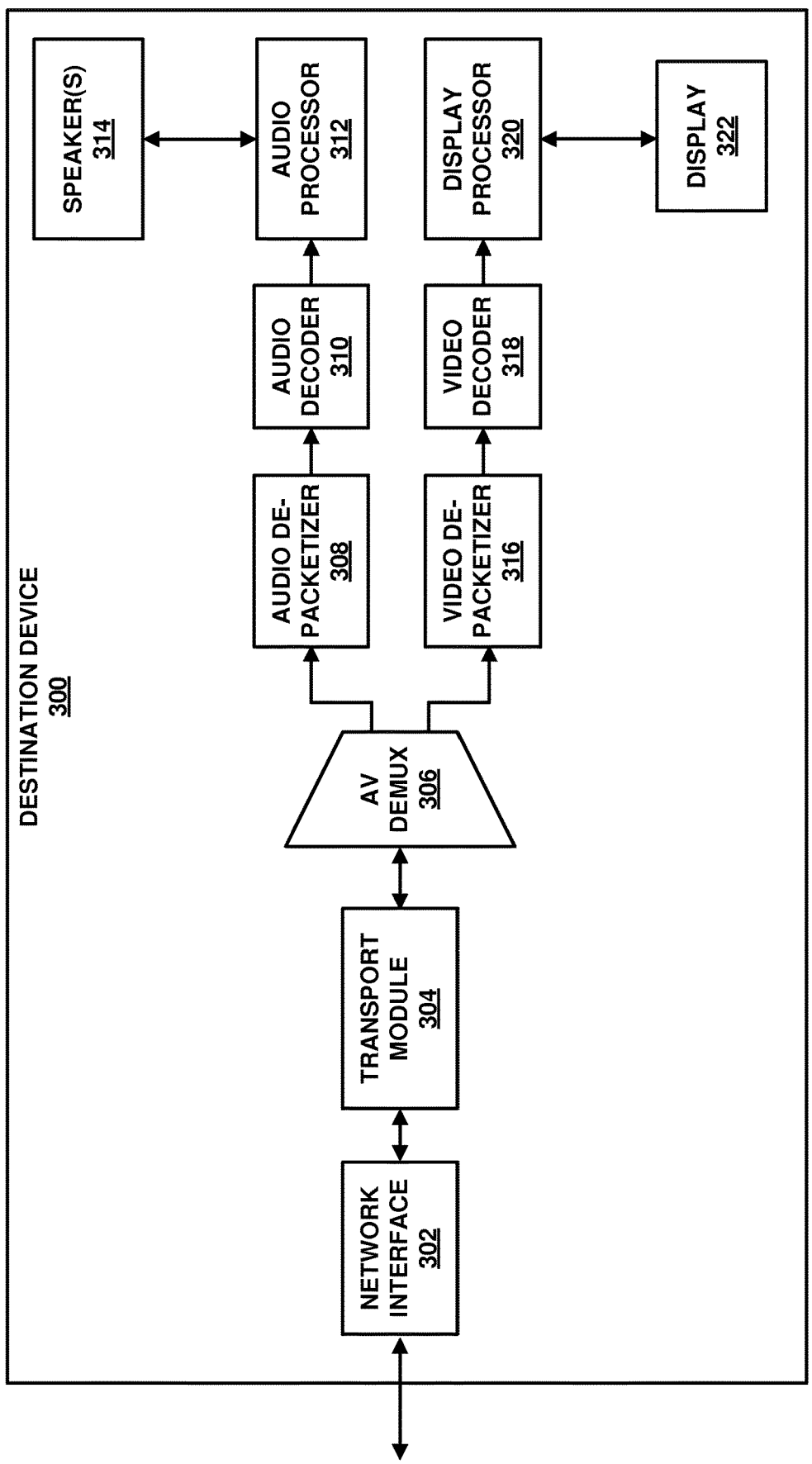
FIG. 3 is a block diagram illustrating an example of a destination device that may implement one or more techniques of this disclosure.

FIG. 3 is a block diagram illustrating an example of a destination device that may implement one or more techniques of this disclosure. Destination device 300 is an example a destination device configured to render a media file. Destination device 300 may be equipped for wired and/or wireless communications and may include devices, such as, for example, displays, televisions, audio receivers, audio amplifiers, speakers, and audio systems. As illustrated in FIG. 3, destination device 300 includes network interface 302, transport module 304, AV demux 306, audio de-packetizer 308, audio decoder 310, audio processor 312, speaker(s) 314, video de-packetizer 316, video decoder 318, display processor 320, and display 322. The components of destination device 300 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Network interface 302 may be configured to enable destination device 300 to communicate with external computing devices via one or more networks. For example, network interface 302 may be configured to enable destination device 300 to communicate using local area network 103. Network interface 302 may include a network interface card, such as an Ethernet card, an optical transceiver, a radio frequency transceiver, or any other type of device that can send and receive information. Network interface 302 may be configured to operate according to one or more communication protocols. Further, in one example, network interface 302 may be configured to perform physical and MAC layer processing according to the physical and MAC layers utilized in system 100. In one example, network interface 302 may configured to perform physical layer and MAC layer processing for physical and MAC layers defined by a Wi-Fi (e.g., IEEE 802.11x) standard. In other examples, network interface 302 may configured to perform physical layer and MAC layer processing supported by one or more of: DLNA, DMS, AirPlay, Chromecast, DIAL, Wide DLNA Support, and RAOP. Transport module 304 may be configured to perform transport layer processing. Transport module 304 may be configured to communicate using one or more of HTTP (Hypertext Transfer Protocol), IP, TCP (Transmission Control Protocol), UDP (User Datagram Protocol), RTP (Real-time Transport Protocol), RAOP, and RTSP (Real Time Streaming Protocol). For example, transport module 304 may be configured to encapsulate and decapsulate received packets. AV demux 306 may apply de-multiplexing techniques to separate video payload data and audio payload data from data stream. For example, AV mux 306 may be configured separate packetized elementary video and audio streams of an MPEG transport stream defined.

Audio de-packetizer 308 may be configured to extract audio packets from an audio stream. Audio decoder 310 may be configured to decode audio data. Audio data may be coded using a specified audio file format. Audio file formats may included lossy and lossless compressed or uncompressed format. Examples of audio file formats include MPEG-1, 2 Audio Layers II and III, MPEG-4, Dolby AC-3, AAC (Advanced Audio Coding), FLAC (Free Lossless Audio Codec), Ogg (e.g., .oga and .ogg file extensions), WAV (Waveform Audio File Format), WMA (Windows Media Audio), at all sampling rates. Audio processor 312 may obtain audio data from audio decoder 310 and may process audio data for output to speakers 314. For example, audio processor 312 may receive audio data in a pulse-code modulation (PCM) format and output an analog audio signal to speaker(s) 314. In one example, audio processor 312 may be configured to support multi-channel formats such those developed by Dolby and Digital Theater Systems. Speaker(s) 314 may include any of a variety of audio output devices such as headphones, a single-speaker system, a multi-speaker system, or a surround sound system.

Video de-packetizer 316 may be configured to extract video packets from a video stream. Video decoder 318 may be configured to decode video data. Video data may be coded using a specified video file format. Examples of video file formats include Audio Video Interleave (.avi), flash (.flv), 3GP (3GPP file format), MKV (Matroska Format), MOV (Apple Quicktime Movie), MP4 (MPEG-4), MPG (MPEG Video file), MPEG, M4V (developed by Apple, Inc.), OGV (Ogg Video file), SWF (Small Web Format), TS (MPEG Transport Stream), WEBM (Open Web Media Project), HEVC (High Efficiency Video Compression), at all resolutions, including, for example 4K (UHDTV). Further, video decoder 318 may be configured to decode digital photo data. Digital photo data may be coded using a specified photo file format. Examples of photo file formats include BMP (Bitmap image file format), GIF (Graphics Interchange Format), Joint Photographic Experts Group formats (JPG and JPEG), PNG (Portable Network Graphics), WEBP (Open Web Media Project), including all resolutions and color depths (e.g., 24-bit true color). Display processor 320 may obtain video and photo data and may process video and photo data for display on display 322. Display 322 may comprise one of a variety of display devices such as a liquid crystal display (LCD), a plasma display, an organic light emitting diode (OLED) display, or another type of display. Display 322 may include a High Definition display or an Ultra High Definition display. In this manner, destination device 300 may be configured to render media data.

Figure 4:
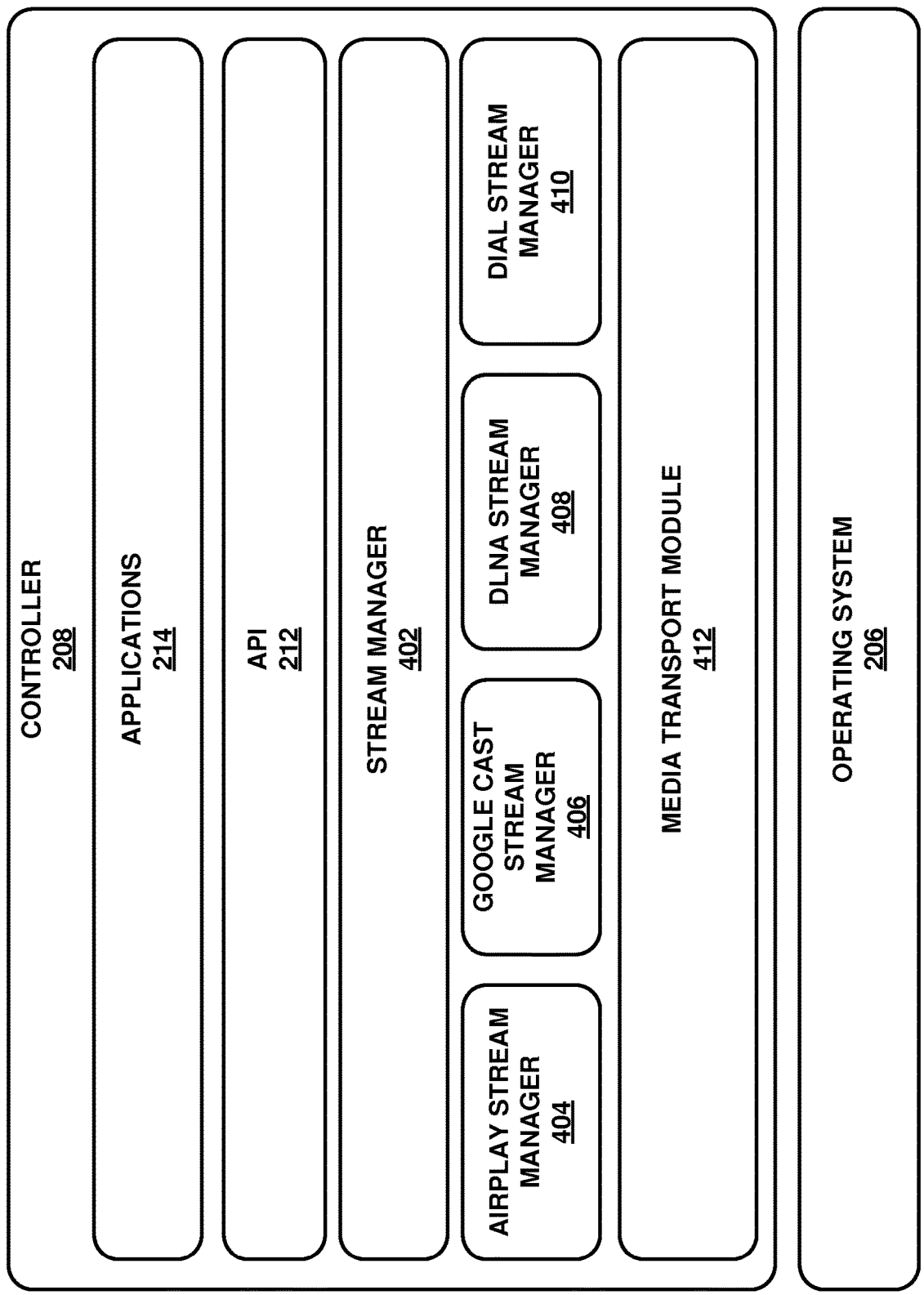
FIG. 4 is a block diagram illustrating an example of a logical architecture that may implement one or more techniques of this disclosure.

As described above, the rendering of media data on a destination device may be controlled by controller 208. FIG. 4 illustrates an example of a logical architecture of a controller. It should be noted that for the sake of brevity content manager and device manager described above with respect to FIG. 2 are not illustrated in FIG. 4. Table 1 provides a summary of example methods included in a device manager and Table 2 provides a summary of example methods includes in a content manager.

TABLE 1

| | |
|---|---|
| startDiscovery( ) | Discover/lookup of all compatible rendering devices and media servers in the network |
| startDiscovery(DeviceType) | Discover specific rendering device type Only |
| stopDiscovery( ) | Turn off discovery/lookup of both rendering devices and media servers |
| fastDLNADiscovery(boolean) | Toggle on/off fast discovery of DLNA devices (consumes more battery) |
| connectDevice(DeviceInfo) | Connect to the rendering device represented by DeviceInfo Object |
| connectMediaServer(DeviceInfo) | Connect to the media server represented by DeviceInfo Object |
| disconnectDevice(DeviceInfo) | Disconnect from the rendering device represented by DeviceInfo Object |
| disconnectMediaServer(DeviceInfo) | Disconnect from the media server represented by DeviceInfo Object |
| disconnectAllDevices( ) | Disconnect from all connected rendering devices |
| disconnectAllMediaServers( ) | Disconnect from all media servers |
| getConnectedDevices( ) | Return a list containing all connected rendering devices |
| getConnectedDevices(DeviceType) | Return a list of connected rendering devices of specific device type |
| getConnectedMediaServers( ) | Return a list of connected media servers |
| setListener(. . .) | Subscribe to discovery and connection notifications for rendering devices and media servers |
| onDeviceDiscovered(DeviceInfo) | Interface callback when a rendering device is discovered |
| onMediaServerDiscovered(DeviceInfo) | Interface callback when a media server is discovered |

TABLE 2

| | |
|---|---|
| browseRemoteMedia(DeviceInfo) | Return a database object containing all resources from the remote media |
| browseRemoteMedia(MSResource) | Return resources found on the media server only at a specific location |
| fastBrowse(boolean) | Toggle fast media server browsing on/off (uses local cache) |
| setRefreshRate(int) | Set how often the resource list is fetched from the server (value specified as seconds) |
| clearCache( ) | Clear the cached content from the media server |
| connectCloudService(Service) | Connect to and authenticate with a cloud storage service, represented by the Service Object |
| browseCloudMedia(ServiceInfo) | Return a database object containing all resources from the cloud storage service |

TABLE 2-continued

| | |
|---|---|
| browseCloudMedia(CSResource) | Return resources found on the cloud storage service only at a specific location |
| disconnectCloudService(Service) | Disconnect from the cloud storage service represented by Service Object |
| getResourceType( ) | Returns the type of the resource file (audio, video, image, folder) |
| getResourceId( ) | Returns a unique identifier of the resource file |
| getResourceDetails( ) | Return a list with all the resource file attributes (e.g. file format, length, EXIF data) |
| getResourceSize( ) | Return the size (in bytes) of the resource file |
| getMetaData( ) | Returns the media tags for audio (e.g. artist, album, genre, year) |

As illustrated in Table 1, in some examples a device manager may be configured to lookup of all compatible rendering devices and media servers in the network or lookup a specific type of compatible rendering devices in a network. As illustrated in Table 2, in some examples a content manager may be configured to toggle media browsing from a local cache. Further, the rate at which the resource list is fetched may be set.

In some examples, a stream manager of a controller may perform techniques described herein independent of how content is managed and devices are discovered. Further, the example logical architecture illustrated in FIG. 4 does not limit the techniques described herein to a particular software architecture, as the techniques described herein may be implemented using any combination of hardware, firmware and/or software implementations. In addition to including applications 214 and application programming interface 212 described above, controller 208 also includes stream manager 402, Airplay stream manager module 404, Google Cast stream manager module 406, DLNA stream manager module 408, DIAL stream manager module 410, and media transport module 412. As described above, a stream manager may be configured to provide functionality for streaming and controlling playback on any compatible rendering device. Table 2 provides a summary of example methods that may be included in stream manager 402.

TABLE 3

| Method | Function |
|---|---|
| Streamer(DeviceInfo) | Initialize streamer to stream to a specific rendering device |
| Streamer(ArrayList<DeviceInfo>) | Initialize streamer to stream to multiple rendering devices |
| play(MediaInfo) | Play media represented as MediaInfo on the rendering device |
| play(MediaInfo, DeviceInfo) | Play specific media on a specific rendering device (i.e. when connected to multiple rendering devices) |
| stop( ) | Stop all media playback on all connected rendering devices |
| stop(DeviceInfo) | Stop media playback on a specific rendering device in case of playback on multiple rendering devices |
| stop(DeviceInfo, Media Info) | Stop playback of specific media on a specific rendering device (i.e. when connected to multiple rendering devices) |
| volumeUp(int) | Increase volume by value provided as integer (range: 0-100) |

TABLE 3-continued

| Method | Function |
|---|---|
| volumeDown(int) | Decrease volume by value provided as integer (range: 0-100) |
| seek(String) | Change playback position to the time value specified as string (format - hh:mm:ss) |
| pause( ) | Pause media playback on all connected rendering devices |
| resume( ) | Resume media playback from the paused state |
| subscribePlaybackState(mediaStateListener) | Subscribe to get state of media playback on the rendering devices (e.g. playback position, volume, state) |
| playRemoteMedia(MSResource) | Play media stored on a media server |

As illustrated in Table 3, stream manager 402 may include methods that enable a user to cause media to be played on one or more of destination devices 105A-105N and control media playback, e.g., control volume, stop playback on one or more devices, pause playback, etc. As described in detail below, the methods of stream manager 402 may provide a layer of abstraction between an application and each type of destination device. That is, stream manager 402 may enable a user to control several diverse types of destination devices. In this regard, stream manager 402 may be referred to as a unified controller.

As described above, a user may initiate playback commands using a graphical user interface provided by an application. For example, a user may select a device by touching an icon representing a device on a touch screen interface and may seek to a particular position of a media file using the touch screen interface. Methods included in stream manager 402 may be a unified command that may be converted to specific commands for a particular type of device. For example, as illustrated in Table 3 stream manger 402 volume command may require an argument within the range of 0-100 format and each a destination device may require a different range (e.g., 0.0-1.0). Thus, stream manager 402 may perform a necessary conversion (e.g., method and/or argument conversion) depending on a device type. Each of Airplay stream manager module 404, Google Cast stream manager module 406, DLNA stream manager module 408, and DIAL stream manager module 410 represent the respective engines to support streaming to a particular destination devices supporting the format. In one example, each of Airplay stream manager module 404, Google Cast stream manager module 406, DLNA stream manager module 408, and DIAL stream manager module 410 may be configured to receive a command from stream manager in a native format.

Media transport module 412 may be configured to support lower layer protocols utilized by each of Airplay stream manager module 404, Google Cast stream manager module 406, DLNA stream manager module 408, and DIAL stream manager module 410. For example, Airplay audio streaming may be supported using the RTSP protocol and after connection is established audio may be transmitted using RTP streams. Further, Airplay may use the proprietary RAOP protocol. DLNA may be supported using UPnP (e.g., RTSP/RTP/UDP) and HTTP. For the sake of brevity the details of each of the underlying protocols of Airplay, Google Cast, DLNA, and DIAL are not described herein. However, Airplay is described in the AirPlay developer reference documents maintained by Apple Inc., Google Cast is described in detail in the Android developer reference documents maintained by Google, Inc., DLNA is described in detail in the DLNA specifications maintained by the Digital Living Network Alliance, and DIAL is described in detail in DIscovery And Launch protocol specification, maintained by Netflix, Inc., each of which are incorporated by reference in their respective entirety.

Figure 5:
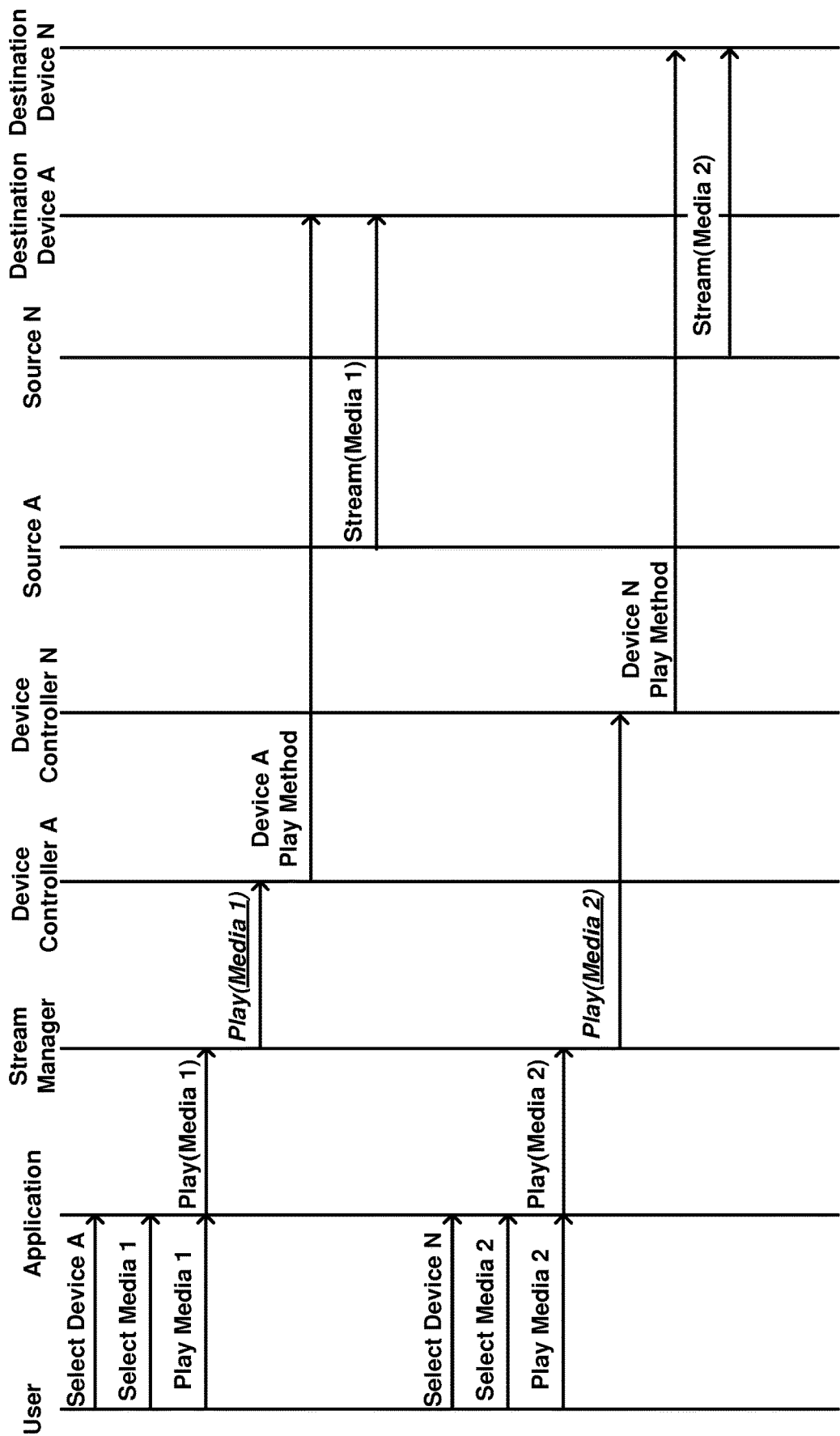
FIG. 5 is a conceptual diagram illustrating an example of a data flow according to one or more techniques of this disclosure.

As described above, controller 208 may be configured to support multi-session and multi-room streaming. FIG. 5 is a conceptual diagram illustrating an example of a data flow for multi-session streaming. As illustrated in FIG. 5, a user may select a device, a media file, and choose to play the media file on the device using an application. In the example illustrated in FIG. 5, a user selects to play a media file referred to as Media 1 on Device A and a media file referred to as Media 2 on Device N. In the example illustrated in FIG. 5, each of Media 1 and Media 2 originate from different sources. As illustrated in FIG. 5, when a user chooses to play a specific media file on a specific device, the play method of the stream manager is called. The play method is converted by the Stream manager and sent to the appropriate device controller. A device controller (e.g., an Airplay stream manager, a Google Cast stream manager, a DLNA stream manager, or a DIAL stream manager) causes a play command to be communicated to a destination device. This causes media to be rendered at the respective destination device, i.e., streamed.

It should be noted that in additional to converting commands, in some instances each of an Airplay stream manager, a Google Cast stream manager, a DLNA stream manager, or a DIAL stream manager may initiate a streaming session differently. For example, some protocols may support a load command while other may not. A Google Cast stream manager module may include a RemoteMediaPlayer class. The RemoteMediaPlayer class includes load methods that may load a media item at a destination device and automatically or optionally start playback of the media item. Another example of a streaming protocol that supports a load command that may be supported by controller 208, includes AllConnect developed by Tuxera, Inc. A DLNA stream manager may be based on UPnP (Universal Plug and Play) and may not support a load command. A DIAL stream manager may not support a load command. An Airplay stream manager may not support a load command. Thus, to enable support of multi-session streaming controller 208 may be configured to initiate independent media streaming session according to the requirements of a destination device. It should be noted that multi-session streaming may not require synchronization between media files during media playback. That is, because the content is different, for most user applications, synchronization of the relative track positions does not need to be maintained. However, controller 208 may ensure that a media playback is consistent with a user's commands. That is, controller 208 may ensure that the first media file a user selects to be played back actually begins to playback before a second media file a user selects to be played back. For example, if a device selected for rendering a first media file has a longer load time than a device selected for rendering a second media file, controller 208 may wait for a load acknowledgement from the device selected for rendering a first media file before enabling playback on the device selected for rendering a second media file. In one example, controller 208 may use the synchronization techniques described below with respect to multi-room streaming.

Figure 6:
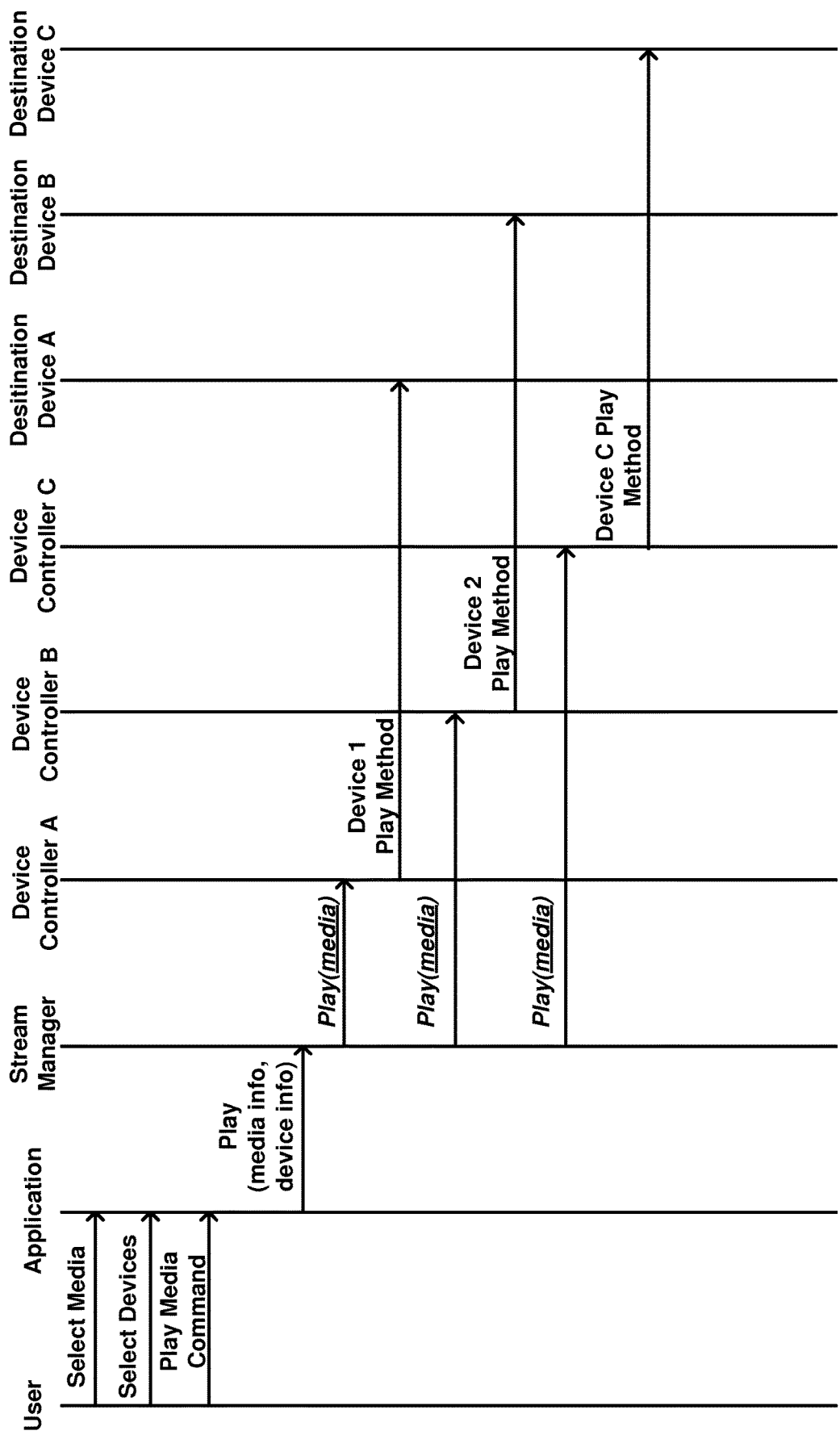
FIG. 6 is a conceptual diagram illustrating an example of a data flow according to one or more techniques of this disclosure.

As described above, controller 208 may be configured to support multi-room streaming. For multi-room streaming to be acceptable to a user, a user may require precise synchronization between playback of multiple streams. For example, if playback at a stereo in a living room is out of synch with playback at an audio system in an adjacent room, the result may be an undesirable perceived echo that is unacceptable to a user. As described in detail below, controller 208 may be configured to ensure synchronization. FIG. 6 is a conceptual diagram illustrating an example of a data flow for multi-room streaming. As illustrated in FIG. 6, a user may select a media file, and choose to play the media file on each of a plurality of devices using an application. In the example illustrated in FIG. 6, a user selects to play a media file referred to as Media 1 (e.g., an audio file) on Device A, Device B, and Device C. As illustrated in FIG. 6, when a user chooses to play the media file on the specified devices, the play method of the stream manager is called.

As described above, with respect to Table 3, a stream manager may include a Streamer(ArrayList<DeviceInfo>) method that is configured to initialize a streamer to stream to multiple rendering devices. Further, as illustrated in Table 3, stream manager may include a play(MediaInfo, DeviceInfo) method that is configured to play specific media on a specific rendering device (i.e. when connected to multiple rendering devices). In one example, these methods may be used by controller 208 to initiate multi-room streaming. In the example illustrated in FIG. 6, the play method may be converted by the stream manager and the stream manager may send appropriate commands to respect device controllers in such a manner that each independent device controller causes the media to be rendered at the respective destination devices in synch. As described above, each of destination device may have different load times where load times may be based on how a streaming session is initiated. Thus, in order to ensure that media playback is synchronized between diverse devices, controller 208 may be configured to ensure audible playback does not occur on any of the destination devices prematurely. That is, for example, controller 208 may be configured to ensure that device A will not begin audible playback, if device B is still initializing a streaming session.

In one example, controller 208 may be configured such that for each respective destination devices, after a connection is established with the device, media is loaded on the target destination device by using specific load and/or play media commands supported by the destination device protocol under use. In order to ensure audible playback does not occur prematurely, controller 208 may carry out this loading process with the playback volume muted, e.g., volume set to 0.0 and/or mute enable commands. Once controller 208 receives confirmation messages from all the devices present in the multi-room group that media is loaded or playback (while muted) has begun, controller 208 sends a pause command to all devices. In one example, controller 208 may implement a playback listener and listen for one of the following statuses: playing, stopped, paused, and error. Upon receiving an acknowledgment that media playback is paused on all devices (e.g., playback status equals paused) a seek command is sent to change that playback position to start of the media file at each device. After the media file is paused at the start position at all devices, a play command with user selected volume is sent to start playback simultaneously on target destination devices. In this manner, controller 208 is configured to ensure that audible play does not begin on any of the target destination devices until all of the devices are in a ready state (e.g., paused at the start position of the media file). It should be noted that there may be several ways to get each target destination device in a ready state. For example, the order in which load and/or play commands are sent to each target destination device may vary. Controller 208 may be configured to get each of the target devices ready in a manner that enables audible playback as quickly as possible. For example, controller 208 may determine that initiating a streaming session using DLNA protocol may take longer than initiating a media session using Google Play. This may be due to underlying transport protocols. As such, controller 208 may be configured to send commands to a DLNA protocol device before sending commands to a Google Play device.

Figure 7:
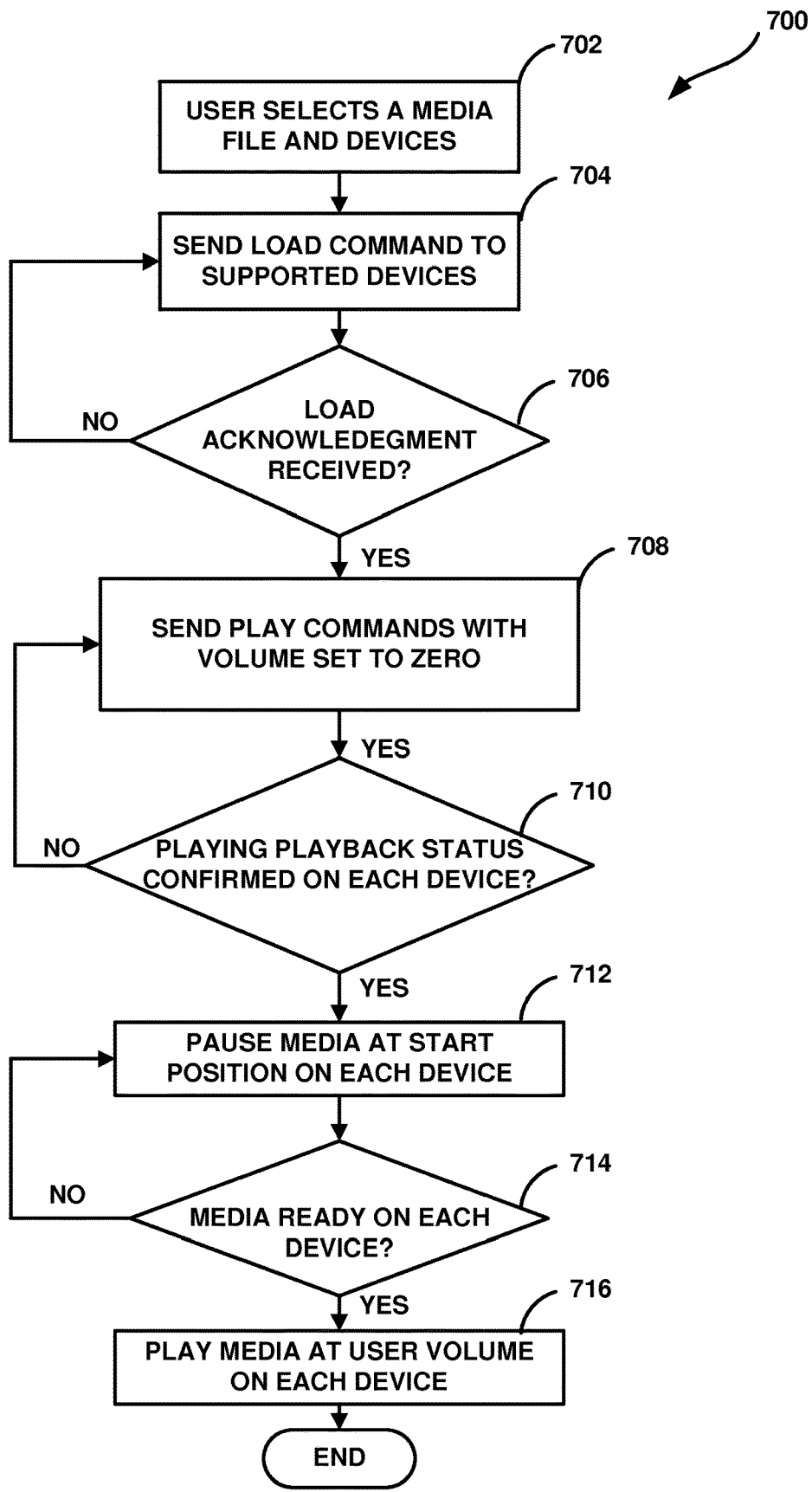
FIG. 7 is a flowchart illustrating an example method for managing network processing according to one or more techniques of this disclosure.

FIG. 7 is a flowchart illustrating an example on how controller 208 may initiate synchronous multi-room streaming. As illustrated in FIG. 7, a user selects a media file and devices for playback (702). As described above, a user may select a media file and devices for playback using a graphical user interface. A device, e.g., a computing device having controller 208 stored thereon, may send a load command to destination devices supporting a load command (704). For example, a Google Play device and/or an AllConnect device. Upon receiving a load acknowledgement (706), a device may send play commands with the volume set to zero to each of the user selected devices (708). Upon receiving a playing playback status from each of the user selected devices (710), device may pause the media file at its start position at each of the selected devices (712). As described above, this may include sending respective pause and seek to zero commands to each of the selected devices. Upon confirming that the media file is paused at the start position at each of the respective selected devices (714), device may cause media playback at a user specified volume at each of the selected devices (716). It should be noted that over most networks media playback will remain in synch at different devices, if playback begins in a synchronous manner. In this manner computing device 200 represents an example of a device configured to enable multi-room streaming.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for enabling synchronized playback of a media file at a plurality of destination devices, the method comprising:
   receiving a user selection of a media item to play;
   receiving a user selection of a first device for playback of the media item, wherein the first device is in communication with a local area network and supports a load media command to initiate a streaming session, wherein a load media command loads a media item prior to automatically or optionally starting playback of the media item, wherein for the first device, a time at which actual media playback occurs is based on a streaming session being initiated with a load media command;
   receiving a user selection of a second device for playback of the media item, wherein the second device is in communication with the local area network and does not support a load media command to initiate a streaming session, wherein for the second device, a time at which actual media playback occurs is based on a streaming session being initiated without a load media command;
   based on the time at which actual media playback occurs at the first device being based on a streaming session being initiated with a load media command and the time at which actual media playback occurs at the second device being based on a streaming session being initiated without a load media command, initiating synchronous multi-room streaming by:
  transmitting a load media command for the media item to the first device;
  upon receiving a load acknowledgement command from the first device, transmitting a play command with inaudible volume playback to the first device and transmitting a play command with inaudible volume playback to the second device;
  confirming playback of the media item at the first device has begun, wherein confirming playback of the media item has begun at the first device includes receiving a playing status from the first device;
  confirming playback of the media item at the second device has begun, wherein confirming playback of the media item has begun at the second device includes receiving a playing status from the second device; and
  upon confirming playback of the media item has begun at the first device and upon confirming playback of the media item has begun at the second device:
    causing playback of the media item at a start position of the media item at the first device, according to a user specified volume, and
    causing playback of the media item at the start position of the media item at the second device, according to the user specified volume.

2. The method of claim 1, wherein receiving a user selection of a media item to play includes receiving a user selection at a device other than the first device for playback and the second device for playback.

3. The method of claim 1, wherein causing playback of the media item at the start position of the media item at the first device according to a user specified volume and causing playback of the media item at the start position of the media item at the second device according to a user specified volume includes:
  transmitting a pause command for the media item to the first device;
  transmitting a pause command for the media item to the second device; and
  upon receiving an acknowledgement that media playback is paused on the first device and upon receiving an acknowledgement that media playback is paused on the second device:
    transmitting a seek to zero command for the media item to the first device and transmitting a seek to zero command for the media item to the second device, and
    transmitting a play command for the media item at the user specified volume to the first device and transmitting a play command for the media item at the user specified volume to the second device.

4. The method of claim 3, further comprising implementing a playback listener and listening for one of the following statuses: playing, stopped, paused, and error.

5. A device for enabling synchronized playback of a media file at a plurality of destination devices comprising one or more processors configured to:
  receive a user selection of a media item to play;
  receive a user selection of a first device for playback of the media item, wherein the first device is in communication with a local area network and supports a load media command to initiate a streaming session, wherein a load media command loads a media item prior to automatically or optionally starting playback of the media item, wherein for the first device, a time at which actual media playback occurs is based on a streaming session being initiated with a load media command;
  receive a user selection of a second device for playback of the media item, wherein the second device is in communication with the local area network and does not support a load media command to initiate a streaming session, wherein for the second device, a time at which actual media playback occurs is based on a streaming session being initiated without a load media command;
  based on the time at which actual media playback occurs at the first device being based on a streaming session being initiated with a load media command and the time at which actual media playback occurs at the second device being based on a streaming session being initiated without a load media command, initiating synchronous multi-room streaming by:
    transmit a load media command for the media item to the first device;
    upon receiving a load acknowledgement command from the first device, transmit a play command with inaudible volume playback to the first device and transmit a play command with inaudible volume playback to the second device;
    confirm playback of the media item at the first device has begun, wherein confirming playback of the media item has begun at the first device includes receiving a playing status from the first device;
    confirm playback of the media item at the second device has begun, wherein confirming playback of the media item has begun at the second device includes receiving a playing status from the second device; and
    upon confirming playback of the media item has begun at the first device and upon confirming playback of the media item has begun at the second device:
      cause playback of the media item at a start position of the media item at the first device, according to a user specified volume, and
      cause playback of the media item at the start position of the media item at the second device, according to the user specified volume.

6. The device of claim 5, wherein causing playback of the media item at the start position of the media item at the first device according to a user specified volume and causing playback of the media item at the start position of the media item at the second device according to a user specified volume includes:
  transmitting a pause command for the media item to the first device;
  transmitting a pause command for the media item to the second device; and
  upon receiving an acknowledgement that media playback is paused on the first device and upon receiving an acknowledgement that media playback is paused on the second device:
    transmitting a seek to zero command for the media item to the first device and transmitting a seek to zero command for the media item to the second device, and
    transmitting a play command for the media item at the user specified volume to the first device and transmitting a play command for the media item at the user specified volume to the second device.

7. The device of claim 6, wherein the one or more processors are further configured to: implement a playback listener and listen for one of the following statuses: playing, stopped, paused, and error.

8. A non-transitory computer-readable storage medium comprising instructions stored thereon, that upon execution, cause one or more processors of a device to:
  receive a user selection of a media item to play;
  receive a user selection of a first device for playback of the media item, wherein the first device is in communication with a local area network and supports a load media command to initiate a streaming session, wherein a load media command loads a media item prior to automatically or optionally starting playback of the media item, wherein for the first device, a time at which actual media playback occurs is based on a streaming session being initiated with a load media command;
  receive a user selection of a second device for playback of the media item, wherein the second device is in communication with the local area network and does not support a load media command to initiate a streaming session, wherein for the second device, a time at which actual media playback occurs is based on a streaming session being initiated without a load media command;
  based on the time at which actual media playback occurs at the first device being based on a streaming session being initiated with a load media command and the time at which actual media playback occurs at the second device being based on a streaming session being initiated without a load media command, initiating synchronous multi-room streaming by:
    transmit a load command for the media item to the first device;
    upon receiving a load acknowledgement command from the first device, transmit a play command with inaudible volume playback to the first device and transmit a play command with inaudible volume playback to the second device;
    confirm playback of the media item at the first device has begun, wherein confirming playback of the media item has begun at the first device includes receiving a playing status from the first device;
    confirm playback of the media item at the second device has begun, wherein confirming playback of the media item has begun at the second device includes receiving a playing status from the first device; and
    upon confirming playback of the media item has begun at the first device and upon confirming playback of the media item has begun at the second device:
      cause playback of the media item at a start position of the media item at the first device, according to a user specified volume, and
      cause playback of the media item at the start position of the media item at the second device, according to the user specified volume.

9. The non-transitory computer-readable storage medium of claim 8, wherein causing playback of the media item at the start position of the media item at the first device according to a user specified volume and causing playback of the media item at the start position of the media item at the second device according to a user specified volume includes:
  transmitting a pause command for the media item to the first device;
  transmitting a pause command for the media item to the second device; and
  upon receiving an acknowledgement that media playback is paused on the first device and upon receiving an acknowledgement that media playback is paused on the second device:
    transmitting a seek to zero command for the media item to the first device and transmitting a seek to zero command for the media item to the second device, and
  transmitting a play command for the media item at the user specified volume to the first device and transmitting a play command for the media item at the user specified volume to the second device.

10. The non-transitory computer-readable storage medium of claim 9, wherein the instructions stored thereon, that upon execution, further cause one or more processors of a device to: implement a playback listener and listen for one of the following statuses: playing, stopped, paused, and error.

* * * * *